US009629497B2

(12) United States Patent
Ciaramelli

(10) Patent No.: US 9,629,497 B2
(45) Date of Patent: Apr. 25, 2017

(54) BEVERAGE PRODUCTION METHOD AND DEVICES

(75) Inventor: Marco Ciaramelli, Naples (IT)

(73) Assignee: KONINKLIJKE DOUWE EGBERTS BV, Utrecht (NL)

( * ) Notice: Subject to any disclaimer, the term of this patent is extended or adjusted under 35 U.S.C. 154(b) by 3 days.

(21) Appl. No.: 14/233,921

(22) PCT Filed: Jul. 18, 2012

(86) PCT No.: PCT/EP2012/064118
§ 371 (c)(1),
(2), (4) Date: Jan. 21, 2014

(87) PCT Pub. No.: WO2013/014047
PCT Pub. Date: Jan. 31, 2013

(65) Prior Publication Data
US 2014/0161945 A1    Jun. 12, 2014

(30) Foreign Application Priority Data

Jul. 22, 2011  (EP) .................... PCT/EP2011/062637
Jan. 9, 2012   (EP) .................... PCT/EP2012/050262

(51) Int. Cl.
*A47J 31/46*   (2006.01)
*A47J 31/06*   (2006.01)
(Continued)

(52) U.S. Cl.
CPC .............. *A47J 31/46* (2013.01); *A23F 5/262* (2013.01); *A47J 31/0615* (2013.01); *A47J 31/0657* (2013.01); *A47J 31/407* (2013.01)

(58) Field of Classification Search
CPC ...... A47J 31/46; A47J 31/407; A47J 31/0615; A47J 31/0657; A23F 5/1262; A23F 5/262
See application file for complete search history.

(56) References Cited

U.S. PATENT DOCUMENTS

2010/0018401 A1*  1/2010  Weinreich ................... 99/280
2012/0164295 A1*  6/2012  Hansen et al. ............. 426/474
2013/0112082 A1*  5/2013  Baldo et al. ................ 99/290

FOREIGN PATENT DOCUMENTS

DE    202 06 545 U1    9/2002
EP    0 622 039 A1     11/1994
(Continued)

OTHER PUBLICATIONS

International Preliminary Report on Patentability for International Application No. PCT/EP2012/064118, mailed Jun. 14, 2013 (12 pages).
(Continued)

*Primary Examiner* — Anthony Weier
(74) *Attorney, Agent, or Firm* — Clark & Elbing LLP; Susan M. Michaud

(57) ABSTRACT

The present invention provides a method, a device and a system for preparing a beverage from an extractable product, such as ground coffee. Said device is provided with a receptacle (2) having an inlet for the extractable product and an outlet (3) for the extracted beverage. The method includes the steps of: providing said extractable product into the receptacle (2); closing off completely the outlet of the receptacle (2); providing a pressurized fluid, such as water and/or water vapor, through the inlet on and/or in the extractable product, thereby pre-extracting the extractable product in the closed receptacle; and opening the outlet (3) when a predetermined threshold, such as a volume, pressure or time related threshold, is reached, thereby obtaining the extracted beverage.

15 Claims, 12 Drawing Sheets

(51) Int. Cl.
    *A23F 5/26*      (2006.01)
    *A47J 31/40*     (2006.01)

(56)        References Cited

FOREIGN PATENT DOCUMENTS

EP          1 016 364 A2      7/2000
EP          1 323 366 A2      7/2003
EP          2 036 469 A1      3/2009
WO          WO-2008/156283 A1  12/2008
WO          WO2010125326    *  11/2010
WO          WO2011077349    *  6/2011

OTHER PUBLICATIONS

International Search Report and Written Opinion for International Application No. PCT/EP2012/064118, mailed Sep. 21, 2012 (11 pages).

* cited by examiner

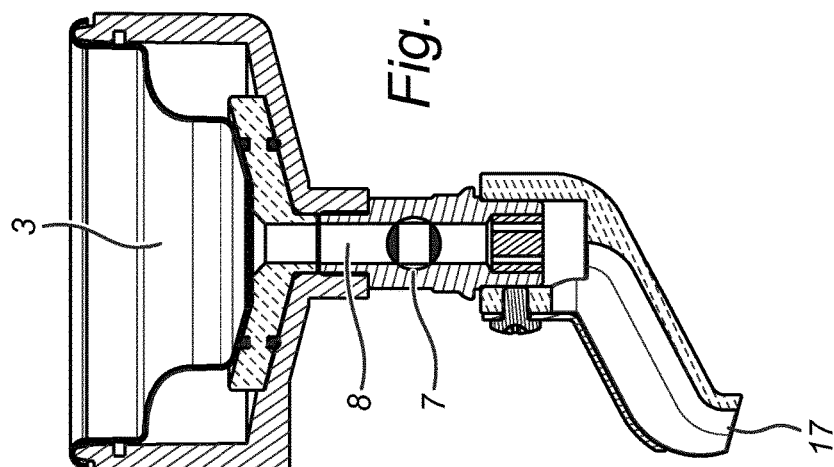
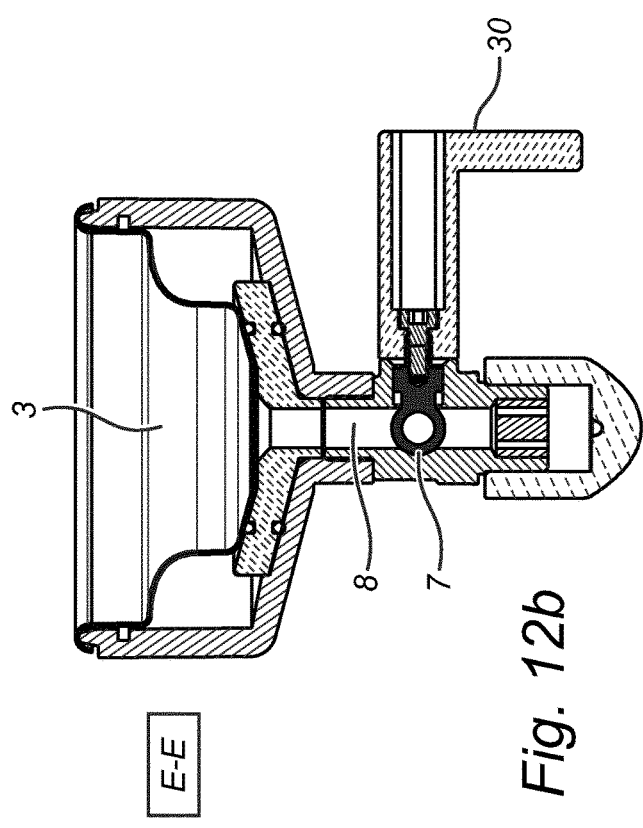
Fig. 12a
Fig. 12b

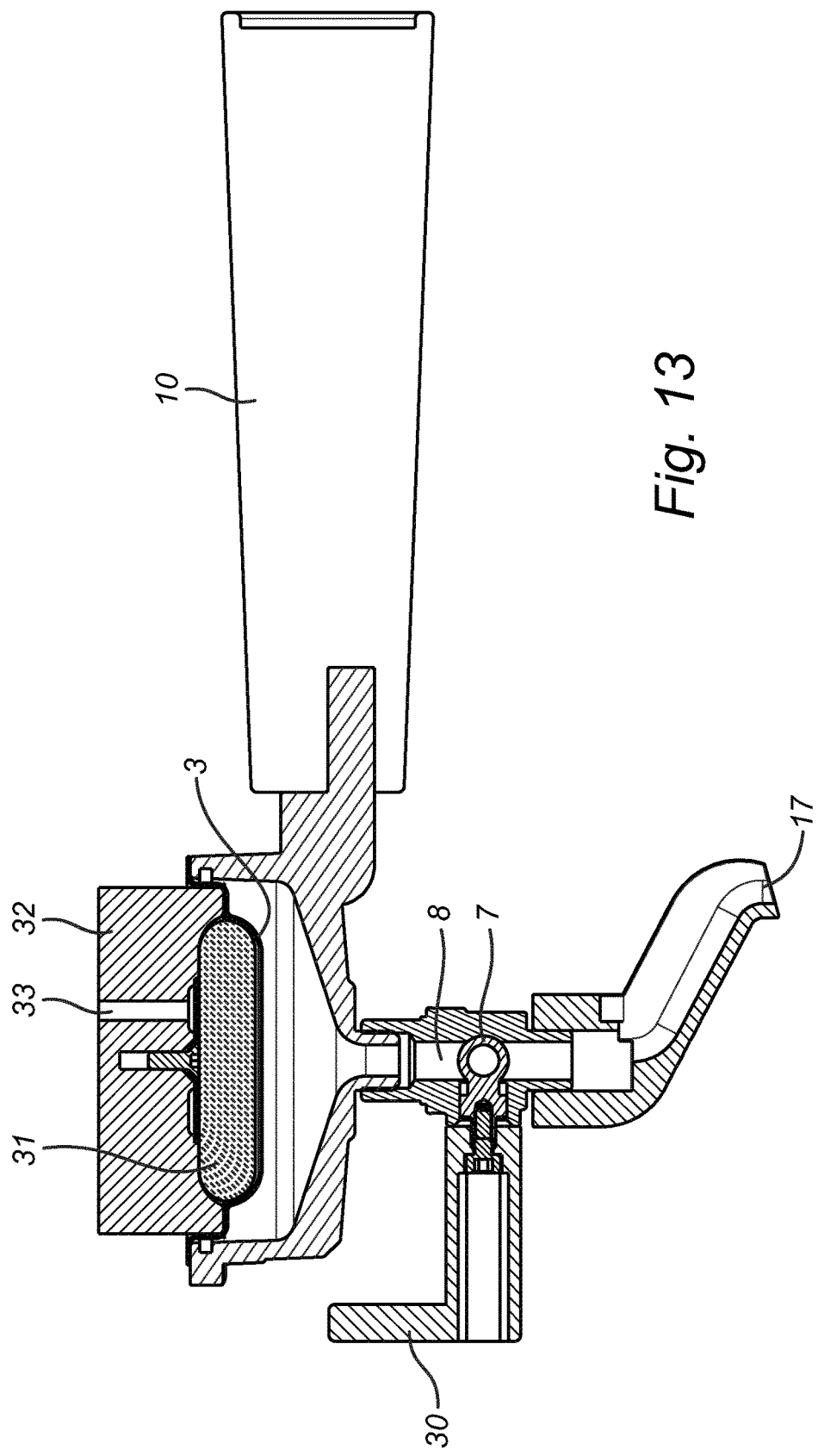

BEVERAGE PRODUCTION METHOD AND DEVICES

CROSS-REFERENCE TO RELATED APPLICATIONS

This application is the U.S. national stage filing under 35 U.S.C. §371 of International Application No. PCT/EP2012/064118, filed Jul. 18, 2012, which claims priority from International Patent Applications PCT/EP2012/050262, filed Jan. 9, 2012, and PCT/EP2011/062637, filed Jul. 22, 2011.

FIELD OF THE INVENTION

The present invention relates to a beverage production method for production of a beverage from an extractable product, for example ground coffee. More especially, the present invention relates to a beverage production method in which a pressurized flow is used for the preparation of the beverage. The invention also relates to a system and a beverage production device using the method of the invention.

BACKGROUND

Devices for preparing a beverage by injecting pressurized fluid into a receptacle containing an extractable product are well-known, especially in the field of producing coffee or coffee type beverages. For simplicity, the word coffee is used to refer to beverages obtained when a pressurized fluid is used during the preparation, more in particular espresso and "caffè crema". The principle of the extraction process, as described in the prior art, can be summarized as follows: the extractable product is inserted in a dedicated chamber, also called receptacle, of a beverage production device. The extractable product can be directly provided to the receptacle which is the case for manual espresso coffee machines. The extractable product can also be provided to the receptacle enclosed in a capsule, a soft or a hard pod according to the used device. The beverage production device comprises at least one fluid injection means for injecting a pressurized fluid, such as water, into the receptacle. The provided fluid interacts with the extractable products contained in the receptacle. As a result of the liquid/solid extraction created in the receptacle, a beverage or other comestible is produced.

For simplicity, we will refer to ground coffee as it's the most used extractable product. However, other comestible ingredients such as chocolate or milk products can also be used with the devices and method of the present invention.

The known methods and devices have several drawbacks. The main drawback is that the extractable material (the ground coffee) introduced in the device for an extraction is not completely used. The incomplete use of the raw material leads to an increase in the used amount per extraction in order to obtain a good beverage. Said incomplete use is explained as follows:

In all known beverage production devices, the ground coffee and its packaging, if available, provide a resistance to the pressurized fluid passage through the receptacle. This leads to the formation of "channels" in the ground coffee powder. Said "channels" represent a preferential way for the pressurized water passage which cannot come into contact with the entire amount of ground coffee present in the receptacle. The amount of ground coffee placed in the receptacle is then only partially used for the preparation of the coffee beverage. This results in a considerable loss of ground coffee and leads to a considerable amount of waste. The liquid under pressure achieves only a partial extraction of all substances of the ground coffee to the detriment either of the quality of the coffee or of the quantity of coffee powder to be used, ending in a higher quantity of coffee.

An additional drawback is the variability of the resulting beverage. This results from the fact that the resistance provided by the ground coffee is itself dependent on different variable parameters. Said parameters comprise: the compression degree of the raw material (ground coffee), its blending, its roasting and its grinding. For instance, in the espresso manual devices, the user fills the receptacle and compresses the ground coffee using a tamper. The compression level of the ground coffee will depend on the physical condition of the user which is variable according to the user but also variable during time for the same user. When the ground coffee is contained in a packaging, be it a capsule, a soft pod or a hard pad, the resistance depends on the grinding and the compression level of the coffee.

Some attempts were made to allow the exploitation of the entire amount of solid substance present in the receptacle, during the liquid/solid extraction and thereby provide infusions with better quality. The attempts are described in EP 1 016 364, EP 0 622 039 and EP 2 036 469 disclosing devices (percolator cups) used in espresso machines.

The described devices are all provided with at least one spring and are based on the same principle. Said spring is pre-loaded in compression and is used as to provide a back pressure to a valve plate. When the pressure in the receptacle exceeded the pressure applied by the spring on the valve/plate, infusion is allowed to flow out of the percolator.

These devices also present several disadvantages such as having a complex design. Said design is only used for espresso machines and cannot be applied in other beverage production devices. A possible damage or fatigue of the spring will influence the pressure threshold at which the infusion can flow out of the device. Moreover, in these devices, the spring will close the valve/plate at the end of the brewing phase. Droplets of infusion might be still present in the receptacle and/or on top of the valve/plate. These droplets remain in the device which is not hygienic, creates dirt and a bad smell in the device. Said droplets will be part of the next performed extraction which, on one hand, considerably lowers the taste of the obtained beverage and, on the other hand, is not healthy for the consumer.

The aim of the present invention is to provide a solution to overcome at least part of the above mentioned disadvantages. The method and devices of the present invention aim to provide a uniform liquid/solid extraction by providing a full control of the pressure inside the receptacle of the beverage production device. The invention is disclosed in the claims.

SUMMARY

In a first aspect, the present invention provides a method for preparing a beverage from an extractable product, such as ground coffee, in a beverage production device, said device is provided with a receptacle having an inlet for the extractable product and an outlet for the extracted beverage, comprising the steps of providing said extractable product into the receptacle; closing off completely the outlet of the receptacle; providing a pressurized fluid, such as water and/or water vapor, through the inlet on and/or in the extractable product, thereby pre-extracting the extractable product in the closed receptacle; and opening the outlet when a pre-determined threshold, such as a volume, pressure or time related threshold, is reached, thereby obtaining the extracted beverage.

In a preferred embodiment, the opening of the outlet is completely and instantly performed. In a preferred embodiment, the outlet remains open at the end of a brewing cycle.

In a preferred embodiment, the opening and/or the closure of said outlet is manually, electrically, electronically, mechanically, electromechanically or hydraulically controlled.

In a preferred embodiment, the extractable product is a pre-portioned dose of coffee provided in a pouch, a capsule or a pad.

In a second aspect, the present invention provides a device for preparing a beverage from an extractable product, such as ground coffee, said device is provided with a receptacle having an inlet for the extractable product and an outlet for the extracted beverage; a pump suitable for supplying a pressurized fluid through the inlet of the receptacle on and/or in the extractable product; and means for completely opening or closing off the outlet of the receptacle, whereby said means are controllable by a pre-determined threshold, such as a volume, pressure or time related threshold. In a preferred embodiment, said means for completely opening or closing off the outlet of the receptacle is a gate and/or a plate which can be movable.

In a preferred embodiment, the receptacle outlet comprises at least one channel having at one end an opening which is in fluid connection with the receptacle and, at the other end, at least one delivery nozzle; a gate movable between a closed position in which the channel is not in fluid communication with the receptacle and an open position in which the channel is in fluid communication with the receptacle.

In a preferred embodiment, the height to the width ratio of the receptacle is comprised between 0.5 and 2, preferably between 0.6 and 1.5, most preferably between 0.8 and 1.

In a preferred embodiment, the receptacle is provided with at least one sensor for measuring the pressure inside said receptacle.

In a third aspect, the present invention provides a system for preparing a beverage from an extractable product comprising a device of the present invention and an extractable product which is a pre-portioned dose of coffee provided in a pouch or a pad, wherein said extractable product is suitable to be closely-fitted in the receptacle of the device.

The extraction according to the present invention is influenced by the controlled pressure inside the receptacle. The height to the width ratio of the receptacle in combination with the controlled pressure inside the receptacle leads to an improvement of the extracted beverage quality. The method and the devices of the invention, thereby, allow a deep infusion of all the ground coffee particles introduced in the receptacle which leads to a full exploitation of the used raw material. Said full exploitation is at a very high level which leads to a beverage with high organoleptic properties.

The combination of the height to the width ratio of the receptacle with the means for completely opening or closing off outlet of the receptacle (gate and/or plate) results in the use of a smaller amount of ground coffee compared to the prior art coffee machines. This will not lower the quality of the obtained beverage. The beverage obtained with the present invention has improved taste and strong character. Indeed, the resistance to water passage and pressure will be high thanks to the adapted granulometry of the ground coffee and/or the dimensions of the receptacle and/or the presence of a gate and/or a plate. The liquid/solid extraction phase will be longer thanks to the height to the width ratio of the receptacle, which allows a better transfer of the aromatic and fatty substances contained in the ground coffee to the pressurized fluid. The use of a smaller amount of extractable product per brewing cycle is cheaper and more environment friendly.

The method and devices of the present invention have several advantages. They allow a deep infusion of each coffee particle present in the receptacle. The means for completely opening or closing off the outlet of the receptacle (such as a gate) of the device will allow the infusion to flow out of the device only when the pressure inside the receptacle and/or the capsule reaches a predetermined value and/or after a predetermined brewing time and/or after a predetermined volume of pressurized fluid is delivered to the extractable product. Thereby, the present invention provides stable brewing conditions, independently from other parameter such as the compression level of the coffee and/or amount of ground coffee introduced in the receptacle. The invention provides a stable level of beverage quality. The invention provides also a full control of the brewing conditions inside the beverage production device. The invention also provides a better emulsion of the extractable product leading to a beverage (coffee) with high quality, taste and crema.

In addition, the gate or the plate of the devices of the invention remains open at the end of each brewing cycle. The valves of the devices of the prior art open at a pressure threshold, however, as soon as the pressure is lower than said threshold, the valves close again. The gate or the plate of the device of the present invention opens when a pre-determined threshold, such as a volume (V) and/or pressure (P) and/or time (T) related threshold, is reached and remains open until the next brewing cycle. Hence, there will be no fluid left in the device at the end of the brewing cycle. This is advantageous as it preserves the good hygiene of the device and provides a healthy beverage to the consumer. The gate or plate is closed again at the beginning of the next brewing cycle. A brewing cycle starts with the introduction of the extractable product into the beverage production device and ends when the beverage is obtained in a container, such as a cup.

The gate or plate of the devices of the invention presents other advantages. For one device, the gate could be set to open and release the produced beverage at (P) and/or (T) and/or (V) values selected by the user. Said (P) and/or (T) and/or (V) predetermined values are selected according to the used raw material (type of coffee, grinding, roasting etc) and/or to the desired beverage output (a more or less "lungo" espresso, a more or less strong coffee etc). This option is not present in the devices of the prior art which are provided with a valve that allows fluid passage at one pressure threshold value. In addition, the gate or plate of the invention is less prone to damages as it is a simple system that is either in the open position or in the closed position. This is not the case for the valves described in the prior art, which are complex systems and are hence more prone to damages.

DESCRIPTION OF THE FIGURES

FIG. 2 shows a section of the receptacle along line II-II in FIG. 1a.

FIG. 12 A shows a longitudinal cross section of the receptacle holder of FIG. 10 along line D-D. FIG. 12 B shows a longitudinal cross section of the receptacle holder of FIG. 10 along line E-E.

FIG. 13 shows a longitudinal cross section of the receptacle holder containing a hard pod. The section is also along line D-D of FIG. 10. The gate of the device is closed.

DETAILED DESCRIPTION OF THE INVENTION

Figure 1A:
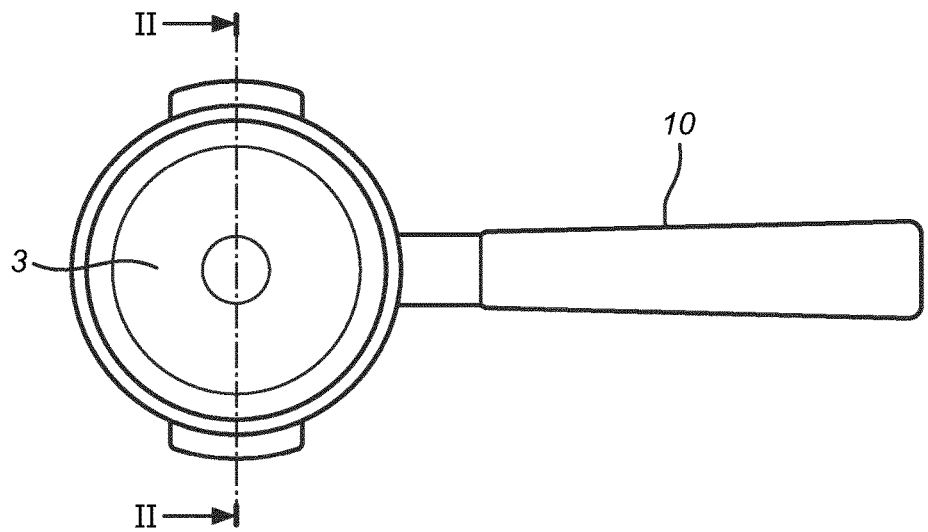
FIG. 1a shows a top view of a receptacle holder of a beverage production device wherein loose ground coffee is used.

The present invention relates to a method, a beverage production device and a system for preparing a beverage from an extractable product, such as coffee.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

In the present application, terms are utilized for which the definitions are given as a preamble below.

The "extraction yield" refers to the strength of the extract and is defined as the weight of total solids in the liquid extract divided by the total weight of starting coffee ingredients in the receptacle (e.g., roast and ground coffee). This value is typically expressed as a percentage.

The "flow time" is defined as the time from the first moment of fluid dropping into the coffee cup to the moment the extracts has been delivered into the cup with the desired weight, strength and character.

The average particle size "D4,3" represents the mean volumetric diameter of the coffee grind as obtained by laser diffraction method using a Malvern® optical instrument and butanol as dispersing agent for the particles.

The "fines" are considered as being coffee particles having a diameter of less than 88.91 microns when measured by the Malvern® laser diffraction method.

The "granulometry" of the ground coffee is defined as the average particle size of the coffee particles and fines level as resulting after grinding.

The expression "% by weight" (weight percent), here and throughout the description unless otherwise defined, refers to the relative weight of the respective component based on the overall weight of the formulation.

The terms "beverage production device", "brewing machine", "coffee machine" and "beverage production apparatus" are used herein as synonyms.

The terms "electro valve" and "gate" are used herein as synonyms.

The terms "first position", "first status" "closed status of the receptacle", "closed status of the receptacle holder", "closed receptacle", "closed receptacle holder", "closed gate" and "gate in closed position" are used herein to refer to the beverage production device when its delivery nozzle is not in fluid communication with the receptacle and fluid cannot flow out of the device.

The terms "second position", "second status", "open status of the receptacle", "open status of the receptacle holder", "open receptacle", "open receptacle holder", "open gate" and "gate in open position" are used herein to refer to the beverage production device when its delivery nozzle is in fluid communication with the receptacle and fluid can flow out of the device.

In a first aspect, the present invention provides a method for preparing a beverage from an extractable product, such as ground coffee, in a beverage production device, said device is provided with a receptacle having an inlet for the extractable product and an outlet for the extracted beverage, comprising the steps of providing said extractable product into the receptacle; closing off completely the outlet of the receptacle; providing a pressurized fluid, such as water and/or water vapor, through the inlet on and/or in the extractable product, thereby pre-extracting the extractable product in the closed receptacle; and opening the outlet when a pre-determined threshold, such as a volume and/or pressure and/or time related threshold, is reached, thereby obtaining the extracted beverage.

In a preferred embodiment, the receptacle outlet remains open at the end of a brewing cycle and is closed at the beginning of a next brewing cycle. This is advantageous as it allows the total volume of fluid used during the previous brewing cycle to flow out of the device, which avoids hygiene problems compared to the situation wherein receptacle and/or the channel is closed progressively with the pressure drop or immediately after the brewing.

In a preferred embodiment, the opening and/or the closure of said receptacle outlet is manually, electrically, electronically, mechanically, electromechanically or hydraulically controlled. The opening and/or the closure of the outlet are independent and separate from the pressure itself. A most preferred embodiment is an electronic control of said opening and/or closure of the receptacle outlet. In a preferred embodiment, said electronic opening and/or closure of the receptacle outlet is dependent on a pre-determined threshold, such as a volume (V) and/or pressure (P) and/or time (T) related threshold. In the prior art devices and methods, the receptacle generally opens in a pressure and a spring strength dependent manner and not as a result of a measurement (P and/or T and/or V) such as in the present invention.

In a preferred embodiment, the opening of the outlet of the receptacle is dependent on a threshold which is a combination of a measured volume (V) and a measured pressure (P) and a measured time (T).

In a preferred embodiment, the receptacle outlet is actively opened and closed. The active opening of the receptacle outlet comprises two steps consisting in measuring and/or detecting the pre-determined threshold and opening the receptacle outlet. In a preferred embodiment, the device is provided with a control unit which measures the pressure (P) inside the receptacle and/or the time (T) during which pressurized fluid is provided to the extractable product and/or the volume of said provided pressurized fluid. Once the predetermined (P) and/or (T) and/or (V) is reached and/or exceeded, the receptacle outlet (being a gate and/or a plate) opens such as to allow the produced beverage to flow out of the receptacle and out of the device.

In a preferred embodiment, said pre-determined volume (V) related threshold is a pre-determined volume of pressurized fluid provided through the inlet of the receptacle on and/or in the extractable product. Said (V) is from 10 to 30 ml, preferably from 11 to 29 ml, more preferably from 12 to 28 ml, most preferably from 13 to 28 ml, even most preferably from 14 to 26 ml or any value comprised in these mentioned ranges. In a further preferred embodiment, said (V) is about 14 ml for a single coffee beverage and about 26 ml for double coffee beverage.

In a preferred embodiment, said pre-determined time (T) related threshold is a pre-determined time during which the pressurized fluid is provided through the inlet of the receptacle. Said (T) is from 0.5 to 8 seconds, preferably from 1 to 5 seconds.

In a preferred embodiment, said pre-determined pressure (P) related threshold is a pre-determined pressure inside the receptacle. Said (P) is comprised between 1 and 8 bars, preferably between 3 and 7 bars, most preferably between 4 and 6 bars.

In a second aspect, the present invention provides a device for preparing a beverage from an extractable product, such as ground coffee, said device is provided with a receptacle having an inlet for the extractable product and an outlet for the extracted beverage; a pump suitable for supplying a pressurized fluid through the inlet of the receptacle on and/or in the extractable product; and means for completely opening or closing off the outlet of the receptacle, whereby said means are controllable by a pre-determined threshold, such as a volume, pressure or time related threshold.

In a preferred embodiment, the means for completely opening or closing off the receptacle outlet of the receptacle can be a gate, a plate or any other means suitable to open or close off the receptacle.

In a preferred embodiment, the receptacle outlet of the present invention comprises a channel or a passage having at one end an opening which is in fluid communication with the receptacle and at the other end a nozzle—also called delivery nozzle. Said nozzle allows the extracted produced beverage to flow out of the device. When a gate is used, it is preferably positioned such as to close off or to open the channel, thereby closing off or opening the receptacle. Said gate is movable between a closed position in which the channel is not in fluid communication with the receptacle and an open position in which the channel is in fluid communication with the receptacle.

When a plate is used, it is preferably positioned at the bottom of the receptacle such as to prevent the fluid to leave the receptacle towards the channel.

In a preferred embodiment, the height to the width ratio of the receptacle is comprised between 0.5 and 2, preferably between 0.6 and 1.5, most preferably between 0.8 and 1.

The brewing pressure of the devices and the methods of the prior art professional machines is up to 9 bar pressure. In the prior art, the pressure effectively applied by the machine is variable and it is driven by more elements such as: compression of the coffee pastille (ground coffee in the receptacle), blending, roasting and/or grinding. Using the devices and the methods of the present invention, a pressure of about 9 bar, more preferably 8, most preferably 6 bar is reached during the pre-brewing phase. This ensures a deep infusion of the grinded coffee. When the gate is open the pressure drops and the brewing occurs at a lower pressure compared to the pre-brewing pressure and to the pressure at which the gate and/or the plate opens. This is advantageous as it provides the beverage with a better emulsion and better taste. Preferably the pressure at which the brewing takes place is from 1 to 8, preferably from 3 to 7, more preferably from 4 to 6 bar. In a preferred embodiment, the gate and/or the plate open when the pressure into the receptacle is about 6 bar.

It is to be understood that the pressure threshold (P) can change according to the brewed product. For instance, (P) is as described in the previous paragraph for professional devices wherein ground coffee is used and (P) is between 8 and 15 atmospheres, preferably 9 and 13 atmospheres, more preferably between 10 and 12 atmosphere or any value comprised within the mentioned ranges for devices wherein a hard pod or a capsule is used for preparing a beverage.

In a preferred embodiment, the beverage production device receptacle is provided with at least one sensor for measuring the pressure inside said receptacle. The sensor is preferably a pressure sensor. When the predetermined pressure is reached inside the receptacle, it will be detected by said sensor which activates and initiates the movement of the gate and/or plate from the closed to the open position. The device can be also provided with any tool known to the person skilled in the art, such as a timer, for the detection of the predetermined values (P) and/or (T) and/or (V).

In a third aspect, the present invention provides a system for preparing a beverage from an extractable product comprising a device of the present invention and an extractable product which is a pre-portioned dose of coffee provided in a pouch or a pad, wherein said extractable product is suitable to be closely-fitted in the receptacle of the device. By closely-fitted it is meant that a very small free space is left between the receptacle inner walls and the pouch or the pad after being introduced in the receptacle. This avoids that the pressurized fluid flows around the pouch or the pad without flowing through the coffee contained therein. Preferably the free space left is less than 2 mm, more preferably less than 1 mm, most preferably less than 0.5 mm. Said free space is defined as the distance between the receptacle inner walls and the pouch or pad outer membrane facing the receptacle inner walls.

In a preferred embodiment, the system comprises a device as described in the present invention and a predetermined quantity of loose ground coffee.

In a preferred embodiment, the system comprises a method according to the present invention.

In a fourth aspect, the present invention provides a receptacle, suitable to be attached to a device for preparing a beverage from an extractable product, having an inlet for introducing the extractable product, an outlet for the extracted beverage and means for completely opening or closing off the outlet of the receptacle, whereby said means are controllable by a pre-determined threshold, such as a volume, pressure and/or time related threshold. Said receptacle can be provided with a handle. Said means comprise a plate and/or a gate which is suitable to completely close off said outlet for carrying a pre-extraction step. In a preferred embodiment, the receptacle of the present invention is provided with at least one sensor for measuring the pressure inside the receptacle and/or the volume of fluid provided to the extractable product and/or the time during which fluid is delivered to the extractable product. The receptacle and/or the receptacle holder are suitable to be attached to any known beverage production device and to a device of the present invention.

In a preferred embodiment, the receptacle and/or the receptacle holder are autonomous in view of the opening of the outlet. Said receptacle and/or the receptacle holder are provided with the necessary electronic arrangement to control the opening of the outlet when a pre-determined threshold of volume and/or pressure and/or time is reached. Said autonomy might be provides by providing at least one battery to the receptacle and/or the receptacle holder to ensure the functioning of the sensor and to ensure the opening of the outlet. In another preferred embodiment, the beverage production device to which the receptacle and/or the receptacle holder is attached controls the opening of the outlet and/or the plate. Said opening is preferably electronically controlled.

In a preferred embodiment, the present invention provides a system for preparing a coffee beverage comprising the device of the invention and an amount of ground coffee suitable to be used with said device. The ground coffee is characterized in that it has a controlled percentage of fines (F) depending on the average particle size (D4,3) within the following limits:

F is lower than 16% when D4,3 is measured between 300 and 350 microns,

F is lower than 18% when D4,3 is measured between 250 and 299 microns,

F is lower than 21% when D4,3 is measured between 200 and 249 microns,

F is lower 28% when D4,3 is measured between 150 and 199 microns.

The granulometry of the ground coffee to be used has been modified with reduced level of fines. Preferably, the percentage of fines (F) is related to the measured range of particle size (D4,3). When the particle size increases, the amount of fines usually inversely decreases. The finer the coffee is ground, the more fines are created. According to one preferred embodiment of the invention, the percentage of fines (F) is determined as a function of D4,3 within the following preferred limits:

(F) is between 12 and 16% when D4,3 is measured between 300 and 350 microns, (F) is between 14 and 18% when D4,3 is measured between 250 and 299 microns, (F) is between 17 and 21% when D4,3 is measured between 200 and 249 microns, (F) is between 22 and 28% when D4,3 is measured between 150 and 199 microns.

In a preferred embodiment of the invention, the receptacle is filled with ground coffee of controlled particle size and reduced amount of fines. In a preferred embodiment, said ground coffee has an average particle size comprised between 190 and 300 microns.

The granulometry of the ground coffee to be used with the apparatus of the present invention is very important. Using ground coffee with reduced amount of fines in combination with the receptacle of the apparatus according to the present invention, the compression of the ground coffee inside the receptacle is no longer needed. The resistance to the passage of the hot pressurized water through the receptacle is assured by the means for closing or opening the receptacle and by the described height to width ratio of the receptacle. The water passes smoothly through the ground coffee which results in an improved solid/liquid extraction and a coffee beverage with high quality, taste and character.

In a preferred embodiment, the granulometry of the used coffee is selected in function of the desired beverage to be prepared. For instance for a ristretto, (F) is between 20 and 22% and D4,3 is measured between 260 and 280 microns. For an espresso, (F) is between 18 and 20% and D4,3 is measured between 280 and 300 microns. For a lungo, (F) is between 14 and 16% and D4,3 is measured between 320 and 340 microns, The granulometry with a reduced amount of fines, as defined above, enables to control the flow time for short coffee extracts. In a preferred embodiment, the flow time for delivering a coffee extract is from 6 to 32 seconds, preferably from 8 to 30 seconds, more preferably from 7 to 28 seconds, most preferably from 10 to 20 seconds, even most preferably from 12 to 18 seconds or any value comprised in any of the mentioned ranges. In a further preferred embodiment, the obtained coffee have an extraction yield (Y) comprised between 15 and 30%, preferably between 18 and 28%, more preferably between 19 and 25%.

In a preferred embodiment, the amount of ground coffee provided to the receptacle is comprised between 3 and 7 grams, preferably between 4.5 and 6.5 grams, more preferably between 4 and 6 grams, most preferably between 5 and 6 grams, per cup of coffee.

The devices according to the present invention, wherein the method of the present invention can be used, will now be described in detail and with reference to the figures. Said devices comprise devices wherein the extractable product is directly provided to the device receptacle and devices wherein the extractable product is provided to the receptacle in a pre-portioned dose contained in a capsule or in a circular pill shaped cartridge which is manufactured from heat-sealing filtering paper.

Figure 1B:
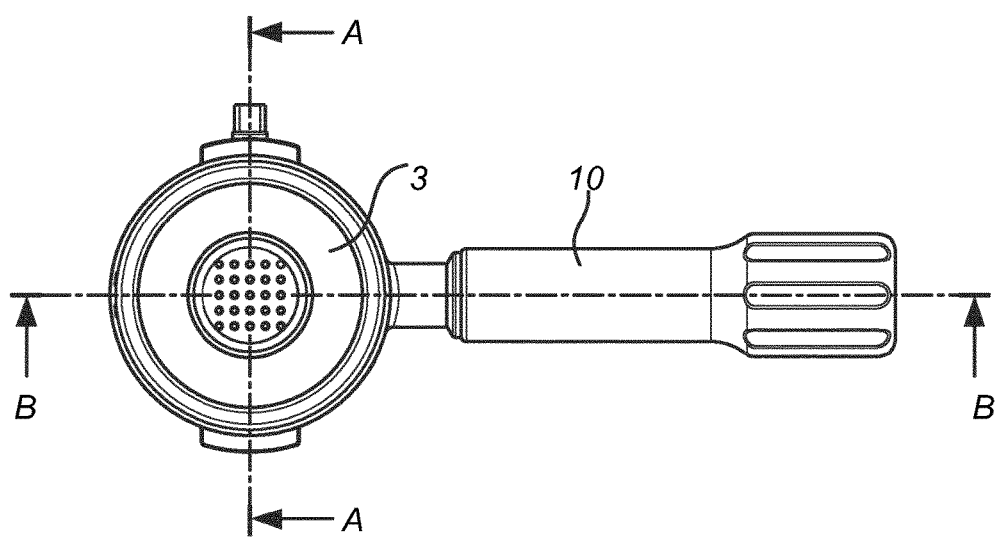
FIG. 1b shows a top view of another receptacle holder of a beverage production device wherein loose ground coffee is used.
Figure 2:
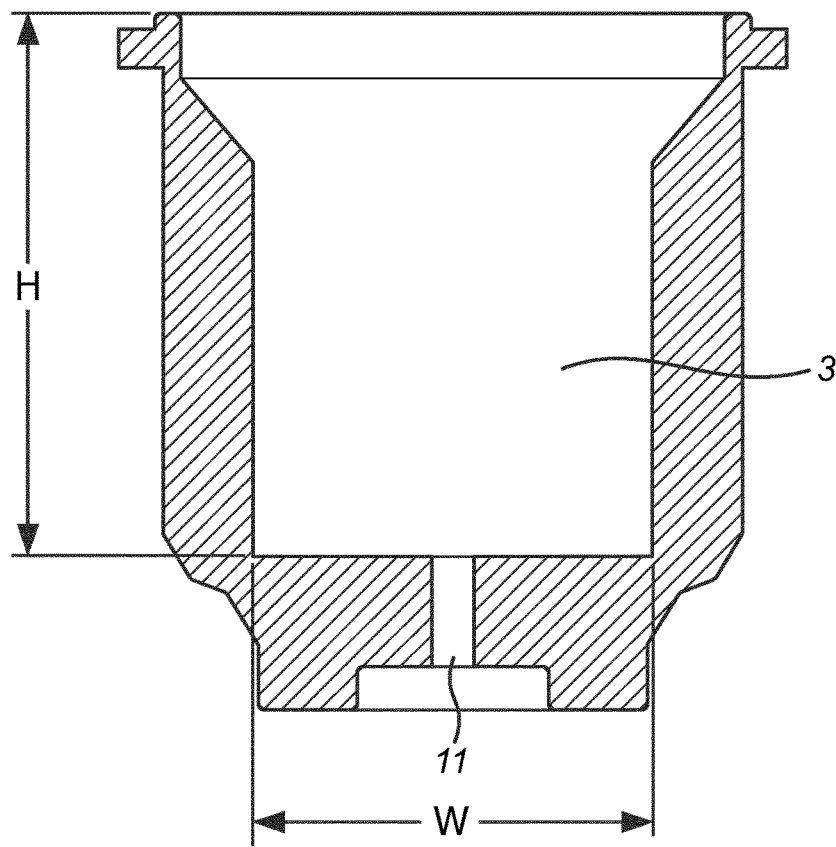

The present invention provides a beverage production device for preparing coffee from an extractable product, such as loose ground coffee, comprising a receptacle having an inlet for the extractable product and an outlet for the extracted beverage. FIGS. 1a and 1b show a receptacle holder used in manual coffee machines. Said receptacle holder comprises a straight handle 10 which is integrally attached to the receptacle 3 for containing said ground coffee and at least one receptacle outlet 11 (FIG. 2) by which the receptacle 3 communicates externally. The beverage is prepared by extracting the flavor contained in the ground coffee by passing hot water under pressure through it. The receptacle coupled to or in the coffee beverage device forms an infusion chamber, in which the flavors contained in the ground coffee are extracted by means of the hot water flowing under pressure through the ground coffee compressed inside the filter. For manual coffee machines, the receptacle holder can be coupled to the coffee beverage device by means of the bayonet coupling.

Figure 1C:
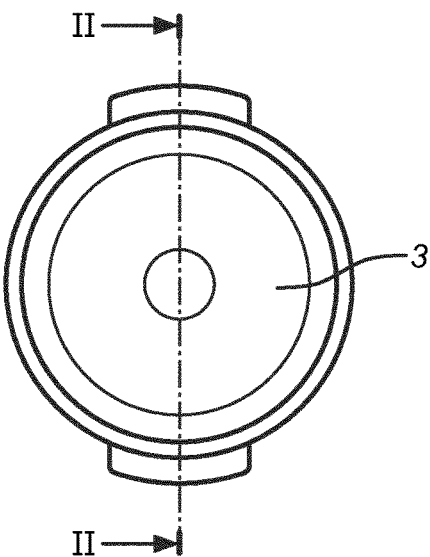
FIG. 1c shows a top view of the receptacle holder used in automatic or vending coffee machines according to the present invention.

FIG. 1c shows a receptacle 3 used in automatic coffee machines and vending coffee machines, said receptacle lacks the handle compared to the receptacle of the manual coffee machines. The beverage is prepared by extracting the flavor contained in the ground coffee by passing hot water under pressure through it. The receptacle coupled to or in the coffee beverage device forms an infusion chamber, in which the flavors contained in the ground coffee are extracted by means of the hot water and/or water vapor flowing under pressure through the ground coffee compressed inside the filter.

The construction and working mode of the device of the present invention can be applied to all known beverage production devices wherein loose ground coffee is introduced into the receptacle of the device. Said devices include:
"Vending coffee machine": machines which dispense coffee to customers automatically, after the customer inserts currency or credit into the machine.
"Automatic coffee machines": machines that, after a simple push of a button, will automatically grind, dose and tamp the coffee, dose the water and brew the coffee.
"Manual coffee machines" or "Espresso coffee machine": machines having a receptacle for the ground coffee that needs to be manually attached to the coffee production machine.

The device according to an embodiment of the present invention further comprises at least one pump as fluid dispensing means for providing pressurized fluid, such as water and/or water vapor, to the receptacle 3. The device is also provided with a boiler for the production of hot water and steam is supplied in a conventional manner by an external water source of cold water. The water source, via a duct and a hydraulic pump, supplies the fluid dispensing means. The hydraulic pump is a motor pump actuated by an electronic drive. The fluid dispensing means comprises a supply unit for discharging the water under pressure to the receptacle 3.

The device according to an embodiment of the present invention further comprises at least one filter means placed in the bottom of the receptacle. The filter means is coupled to the receptacle, for example by adhering to the walls of the receptacle, so that the ground coffee is prevented from coming out. The infusion formed in the receptacle will drain through the filter to leave the receptacle through at least one aperture provided in a plate of said receptacle. The nozzle is located downstream of the receptacle and/or the receptacle outlet.

In a preferred embodiment of the present invention, the filter means is removably coupled to the receptacle. In this embodiment, the filter means have a basket shape that fits in the receptacle. At least two different filter means, having different depth are then provided with the apparatus. Said at least two filter means are designed to receive a different amount of ground coffee corresponding to the preparation of an espresso or a doppio coffee. This can be applied to the manual coffee machines.

The device of the present invention is characterized in that the height (H in FIG. 2) to the width (W in FIG. 2) ratio of the receptacle 3 is comprised between 0.5 and 2, preferably between 0.6 and 1.5, more preferably between 0.8 and 1. The height of the receptacle 3 is comprised between 1 and 10 cm, preferably between 1.5 and 8 cm, more preferably between 2 and 6 cm. The width of the receptacle 3 is comprised between 1 and 10 cm, preferably between 1.5 and 8 cm, more preferably between 2 and 6 cm.

The use of a receptacle having a height to a width ratio as described in this invention (FIG. 2) is very advantageous. Indeed, the mass of ground coffee filled in the receptacle 3 will have a substantial vertical distribution. Therefore, the time required by the hot pressurized fluid to reach the bottom of the receptacle will be longer compared to the time required when a receptacle with a width larger than the height is used. Similarly, the time required by the hot pressurized fluid to reach a given pressure threshold in the receptacle will be longer compared to the time required when a receptacle with a width larger than the height is used. This provides a longer liquid/solid extraction phase which makes it possible to use a smaller amount of coffee and at the same time obtain a coffee with a good taste and crema.

In a preferred embodiment, the receptacle of the beverage production device has a shape selected from the group of: cylindrical, substantially cylindrical, frusto conical and inversed frusto conical.

In a preferred embodiment, the receptacle comprises an inlet 43 (FIG. 15) for the extractable product and an outlet for the extracted beverage. The outlet comprises at least one channel having at one end an opening which is in fluid connection with the receptacle and, at the other end, at least one delivery nozzle. The receptacle outlet further comprises a gate movable between a first position in which the channel is not in fluid communication with the receptacle (=closed position) and a second position in which the channel is in fluid communication with the receptacle (=open position). The receptacle also comprises a base plate 40 which can be a filter, a circumferential upstanding wall 41 and an inlet 43.

Figure 15:
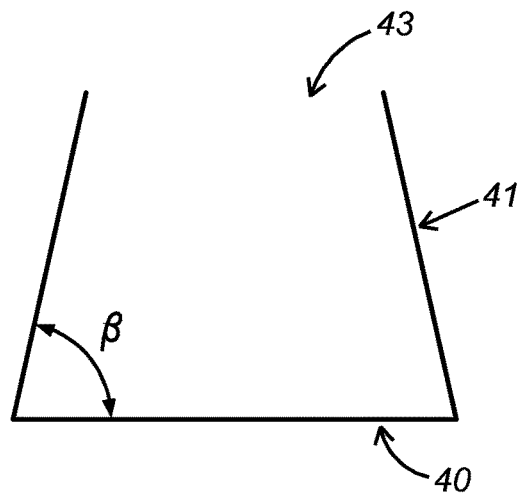
FIG. 15 shows a longitudinal cross section of a receptacle according to line A-A of FIG. 1a. The receptacle outlet is not shown in FIG. 15, only the receptacle for receiving coffee is shown.

Said inlet is contained in a plane which is parallel to the plane of the base plate 40 (FIG. 15). The description of the height to the width ratio of the receptacle of the present invention is such as the height extends from the base plate 40 to the inlet 43 while the width is the average width and/or diameter of the base plate 40 to the width and/or diameter of the inlet 43 of the receptacle.

In a preferred embodiment, the ratio between the width and/or diameter of the receptacle inlet 43 and the width and/or diameter of the receptacle base plate 40 is comprised between 0.5 and 2, preferably between 0.6 and 1.5, more preferably between 0.8 and 1.

In a preferred embodiment, the angle β (FIG. 15) between the receptacle base plate 40 and the circumferential upstanding wall 41 is comprised between 20 and 160°, preferably between 30 and 150°, more preferably between 40 and 140°, most preferably between 50 and 130°, even most preferably between 60 and 120° or any value in between.

Figure 3A:
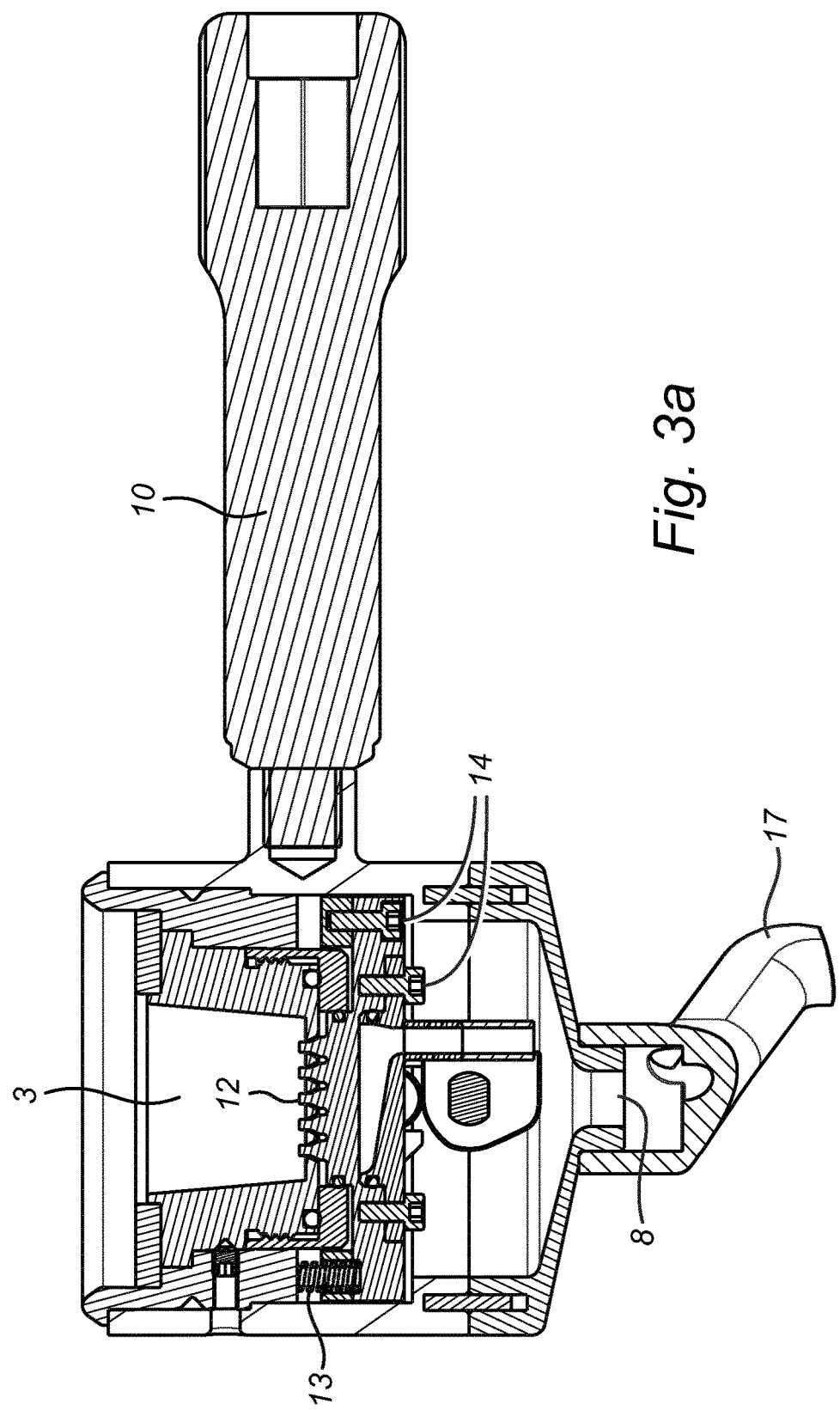
FIG. 3a shows a section along line B-B in FIG. 1b of the receptacle holder according to an embodiment of the present invention.
Figure 3B:
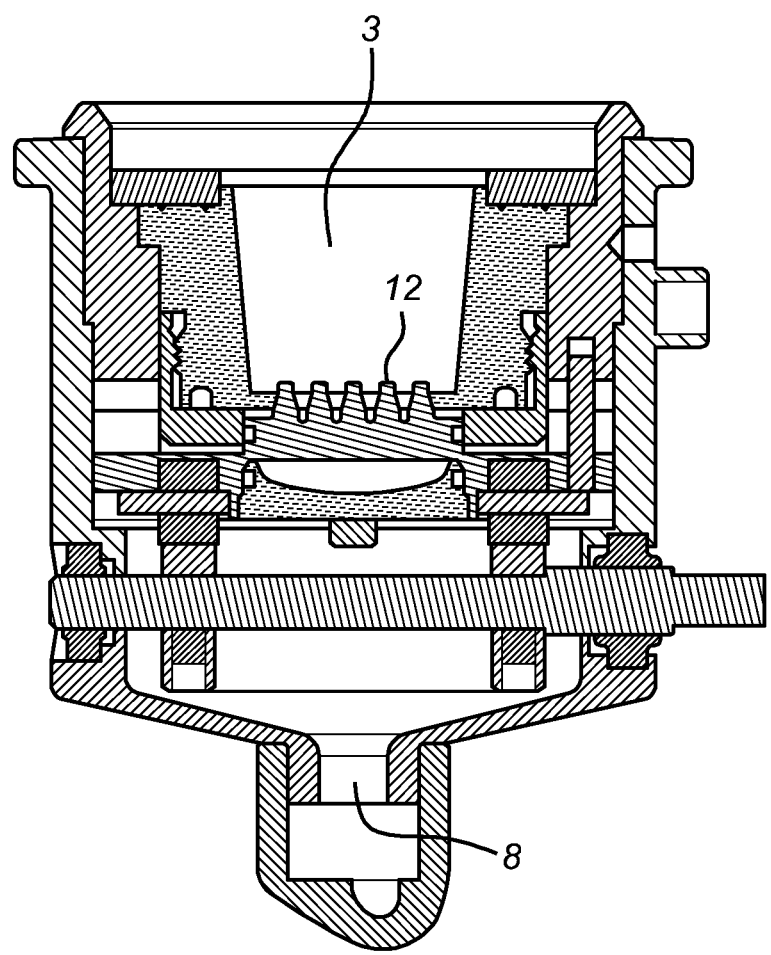
FIG. 3b shows a section along line A-A in FIG. 1b of the receptacle holder according to an embodiment of the present invention.

A preferred embodiment of the receptacle holder is presented in FIGS. 1a and 1b. The receptacle holder comprises a straight handle 10 which is integrally attached to the receptacle 3 for containing ground coffee. FIG. 3a shows a section of the receptacle holder along line B-B in FIG. 1b. The height to the width ratio of the receptacle is comprised between 0.5 and 2, preferably between 0.6 and 1.5, more preferably between 0.8 and 1. The channel 8 of the receptacle outlet is shown in FIG. 3a, FIG. 3b, FIG. 4 and FIG. 5. Said channel 8 is connected to a delivery nozzle 17, through which the beverage will flow into the cup or the receptacle placed underneath said receptacle holder.

The receptacle holder further comprises a plate 12 provided with protrusions as shown in FIG. 3a, FIG. 3b, FIG. 4 and FIG. 5. The protrusions may have any shape, size and number according to the need. The protrusions may have a shape selected from: pyramids, domes, cone frustums, elongate ribs, spikes or blades. The receptacle holder is further provided with at least one spring 13 and a plurality of screws 14 (shown in FIG. 3a). Said spring and screws are maintaining the plate 12 in substantially horizontal, preferably in a horizontal position such as no fluid and/or coffee particles are capable of escaping from the receptacle 3. Said receptacle is further provided with a gate 7 positioned between the plate 12 and the delivery nozzle. Said gate 7 is movable between two positions. The first position, presented in FIG. 4, corresponds to a closed status of the receptacle or the receptacle holder in which the channel 8 is not in fluid communication with the receptacle 3. In this case, the delivery nozzle is not in fluid communication with the receptacle and fluid cannot flow outside the device. The second position, presented in FIG. 5, corresponds to an open status of the receptacle or the receptacle holder in which the channel 8 is in fluid communication with the receptacle 3. In this case, the delivery nozzle is in fluid communication with the receptacle and fluid can flow outside the device.

Figure 4:
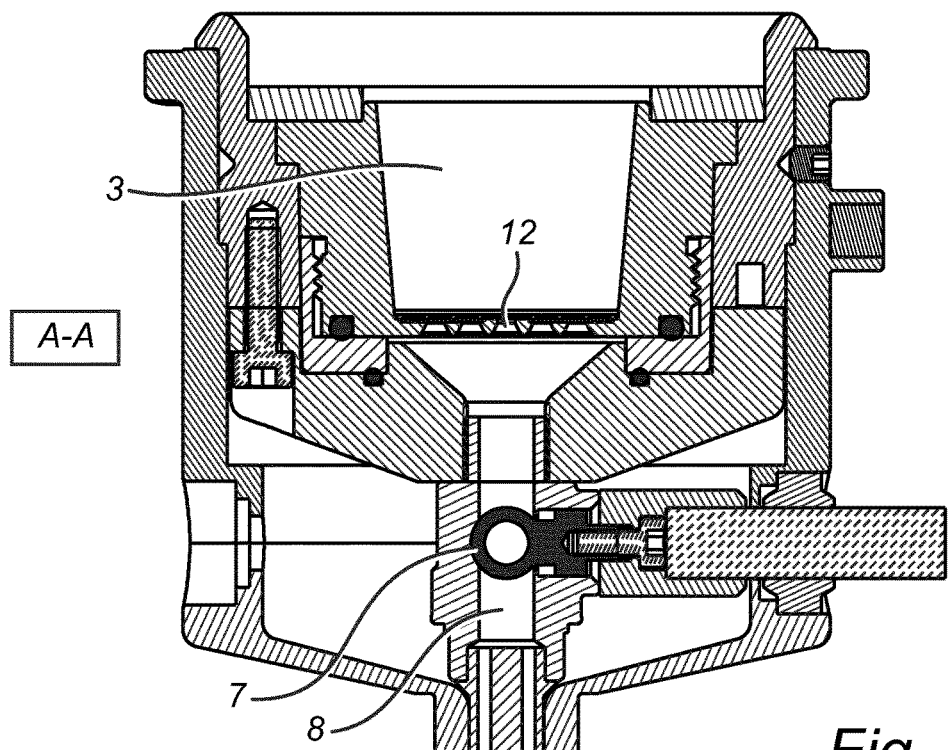
FIG. 4 shows a section along line A-A in FIG. 1b of the receptacle wherein the gate is closed.
Figure 5:
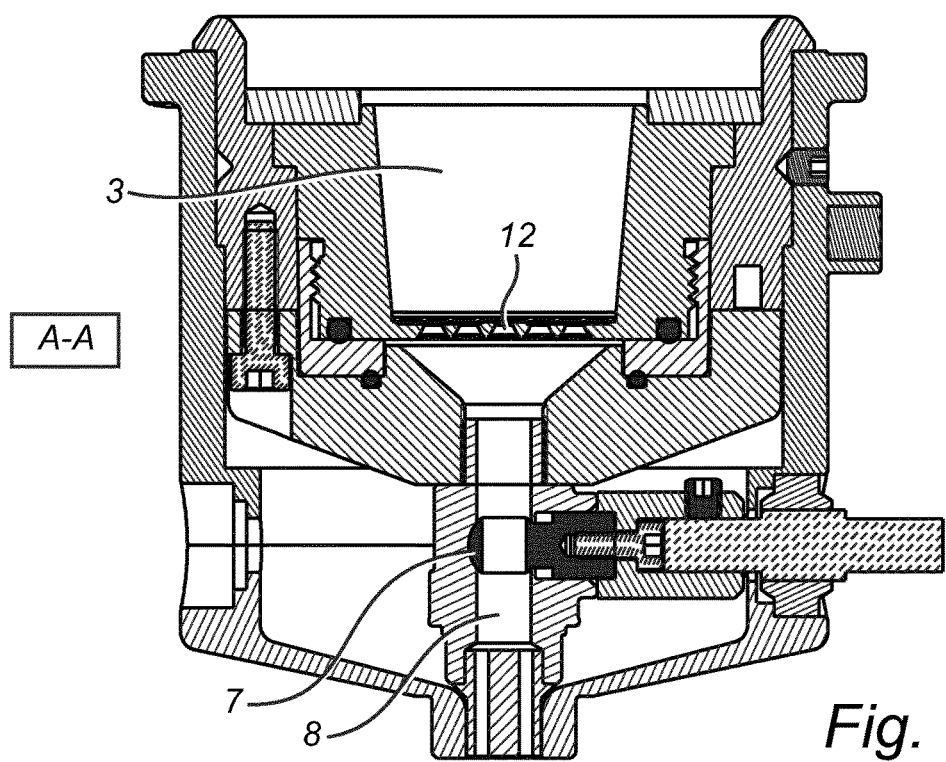
FIG. 5 shows a section along line A-A in FIG. 1b of the receptacle wherein the gate is open.

In operation mode, the receptacle 3 is filled with ground coffee and placed and/or attached to the beverage production device. At this stage, the receptacle is in the open status and the gate 7 is in the position showed in FIG. 5. Following instruction from the user, the gate 7 will first move so as to have the receptacle in its closed status as shown in FIG. 4. The instruction from the user can be pushing on a bottom positioned in a user interface at the outer surface of the brewing machine. As known by the person skilled in the art, the user interface can be electronically connected to the receptacle holder and induces the actions required for opening the gate 7. When the receptacle is in its closed status (FIG. 4), pressurized fluid is provided to the receptacle 3, in which the pressure will progressively increase until reaching a predetermined pressure (P). When (P) is reached, the gate 7 will move so as to have the open status of the receptacle (FIG. 5) wherein the fluid flows out of the receptacle. The movement of the gate 7 is preferably a rotational movement. Optionally, when (P) is reached, the plate 12 will slightly move thereby allowing the coffee to flow to the receptacle channel 8. The movement of the plate 12 can be a downward movement or a bending movement which will lead the plate to have a convex or a concave shape. The pressure value (P) at which the gate 7 and optionally the plate 12 moves could be detected and/or measured by placing a pressure sensor in the receptacle holder, preferably in the receptacle 3. It is to be understood that the gate moves to the open status of the receptacle at a predetermined (P) and/or (T) and/or (V) as detailed above.

In a preferred embodiment, the movement of the gate is complete and instant. This means that the opening and/or the closing of gate and hence of the receptacle outlet does not take place progressively but at once. The gate is operable between only two positions which are the open and the closed position (a binary working mode). There is no intermediate position of the gate.

During the time required for reaching (P), inside the receptacle, and/or (T) and/or (V), and so for the opening of gate 7, a pre-brewing step of the ground coffee takes place. Hence, the ground coffee is in contact with the fluid for a longer time compared to the previous brewing machines. All the aroma of the used ground coffee is then extracted and a coffee with very high quality is obtained by using a smaller quantity of ground coffee. During the brewing time and until the end of the brewing, the pressure inside the receptacle will progressively drop and the receptacle holder remains in its open status which will be the starting configuration for the next brewing cycle.

In another embodiment, the plate 12 is movable. In operation mode of this embodiment, the receptacle 3 is filled with ground coffee and placed and/or attached to the brewing machine. At this stage, the receptacle is in an open status and the receptacle 3 is not completely closed by the plate 12. Following instruction from the user, the plate 12 will first close so as to have the receptacle in its closed status. The instruction from the user can be pushing on a bottom positioned in a user interface at the outer surface of the brewing machine. As known by the person skilled in the art, the user interface can be electronically connected to the receptacle holder and induces the mechanical actions required for the brewing operation. When the receptacle is in its closed status, pressurized fluid is provided to the receptacle 3, in which the pressure will progressively increase until reaching a predetermined pressure (P). When (P) is reached, the plate 12 will slightly move so as to allow the coffee to flow to the receptacle outlet thereby having the receptacle in its open status. The movement of the plate 12 can be a downward movement or a bending movement which will lead the plate to have a convex or a concave shape. The pressure value (P) at which the plate 12 moves could be detected and/or measured by placing a pressure sensor in the receptacle holder, preferably in the receptacle 3. It is to be understood that the gate moves to the open status of the receptacle at a predetermined (P) and/or (T) and/or (V) as detailed above.

During the time required for reaching (P) inside the receptacle and for the opening of plate 12, a pre-brewing or a pre-extraction step of the ground coffee takes place. Hence, the ground coffee is in contact with the fluid for a longer time compared to the previous brewing machines. All the aroma of the used ground coffee is then extracted and a coffee with very high quality is obtained by using a smaller quantity of ground coffee. During the brewing time and until the end of the brewing, the pressure inside the receptacle 3 will progressively drop and the receptacle holder remains in its open status which will be the starting configuration for the next brewing cycle.

Figure 16:
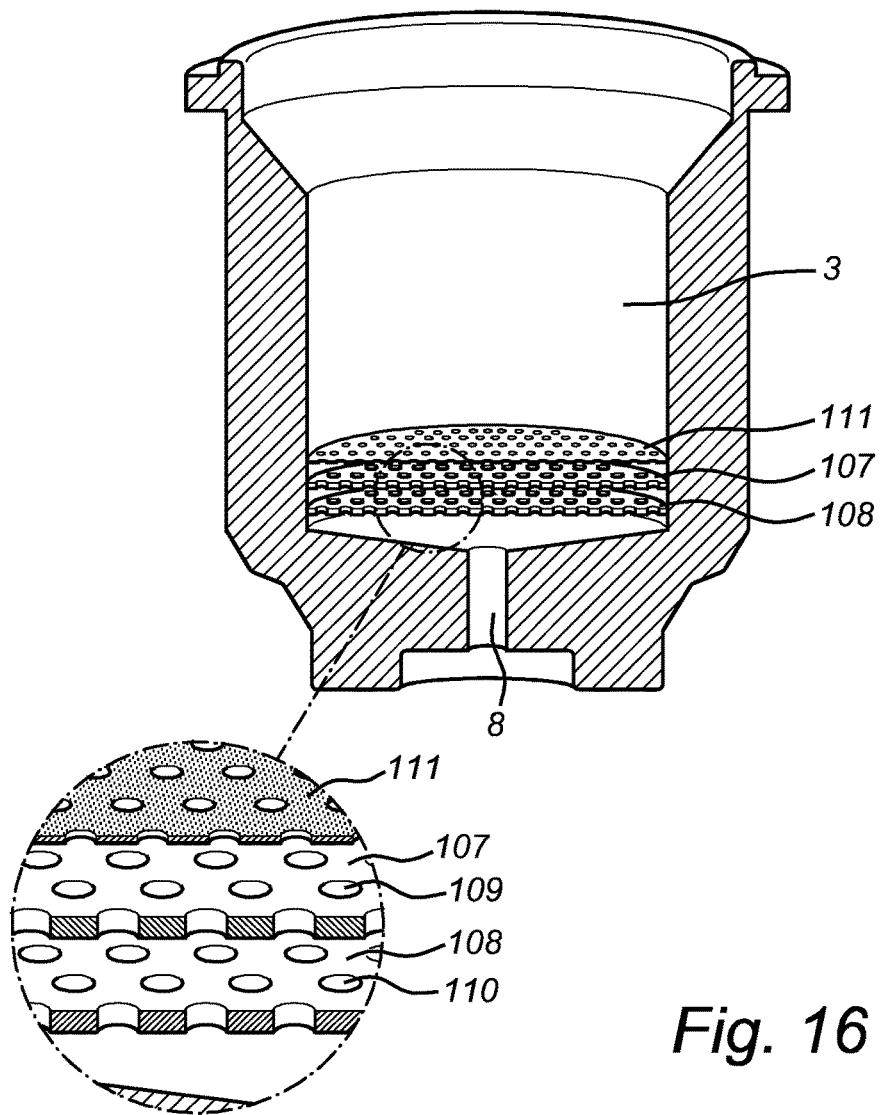
FIG. 16 shows a section along line II-II in FIG. 1a of the receptacle holder according to an embodiment.

In another embodiment shown in FIG. 16, the receptacle 3 comprises two superposed plates 107, 108 between the receptacle 3 and the channel 8. In each plate a series of similar open apertures 109, 110 are provided. The apertures 109, 110 of each plate have the same shape, preferably round holes. When the receptacle is not used, the plates are in a position such as their respective apertures 109, 110 are not aligned. When the receptacle is used and when the pressure reaches a pre-set level, the plates move such as the apertures 109, 110 of both plates 107, 108 are aligned, thus creating a passageway for the coffee to drain and leave the apparatus through the receptacle outlet. In a preferred embodiment, the movement of the plates 107, 108 is occurring when a predetermined (P) and/or (V) and/or (T) is reached. It is to be understood that either one of the two plates 107, 108 can be moved while the other is fixed or, alternatively, the two are mobile. The plates 107, 108 move according to a circular movement. Preferably, the pressure threshold at which the movement of the plates 107, 108 is triggered is comprised between 8 and 15 atmospheres, preferably 9 and 13 atmospheres, more preferably between 10 and 12 atmosphere or any value comprised within the mentioned ranges.

The present invention provides a beverage production device for preparing coffee from pre-portioned dose of coffee. By "pre-portioned dose" of coffee, it is meant a pre-portioned dose of coffee which is packed in paper, plastic, aluminum or any other material such as the coffee is directly exposed to the pressurized water provided to the receptacle. The "pre-portioned dose" of coffee comprises capsules and pods containing ground coffee. A pod refers to "soft pods" also called "pads" and to "hard pods". The "soft pods" or "pads" are filled with 6-14 gr of ground coffee which is not pressed. The "hard pods" are filled with 6.25-7.5 gr of compressed ground coffee. The pods filled have a circular pill shape and are manufactured from heat-sealing filtering paper. A capsule is placed in the receptacle, being a capsule "open" for entrance of water and exit of coffee. Such capsules are well-known for the person skilled in the art.

Figure 6:
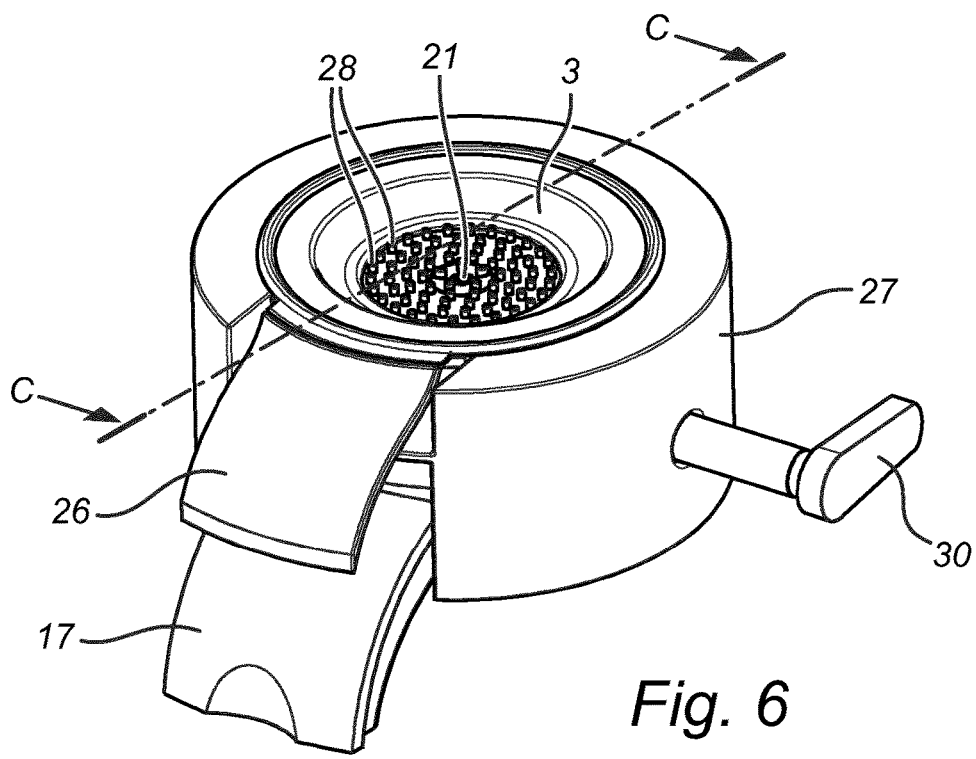
FIG. 6 shows a top view of the removable intermediate part and the stationary part of a beverage production device wherein the ground coffee is provided in a circular pill shaped cartridge which is manufactured from heat-sealing filtering paper.
Figure 8:
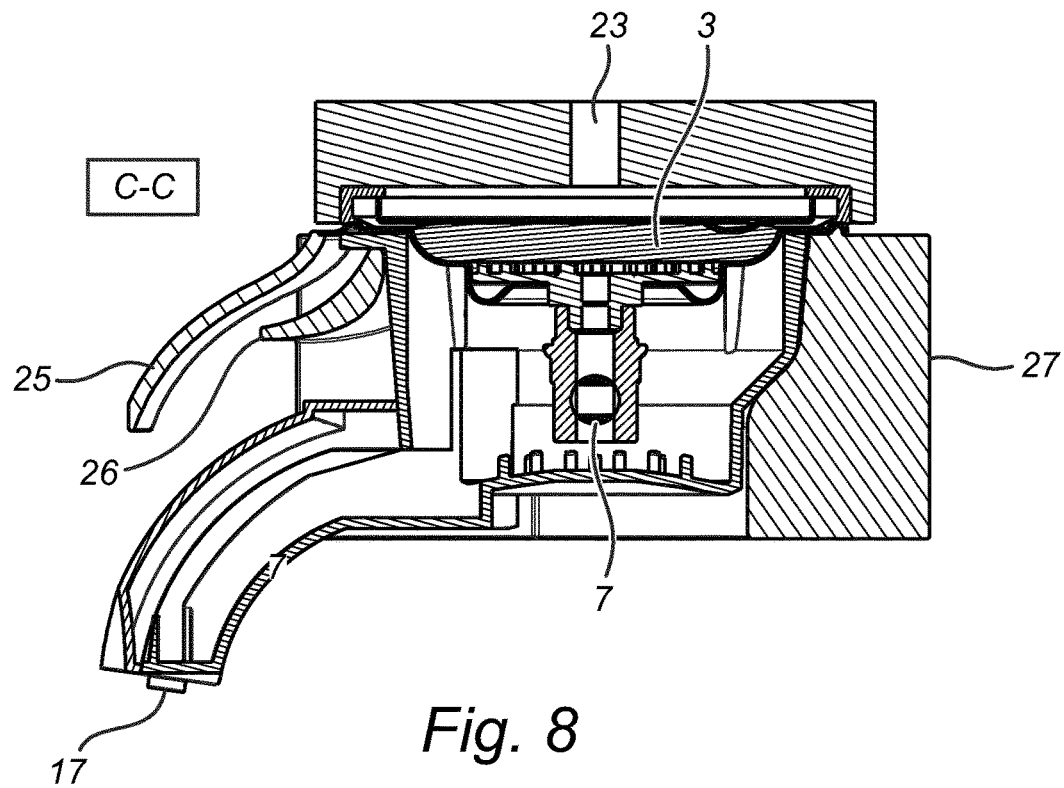
FIG. 8 shows a cross sectional view of the movable upper part, the movable removable intermediate part and the stationary part of a beverage production device wherein the ground coffee is provided in a circular pill shaped cartridge which is manufactured from heat-sealing filtering paper. The gate of the device is closed. The cross section line C-C is shown in FIG. 6.
Figure 9:
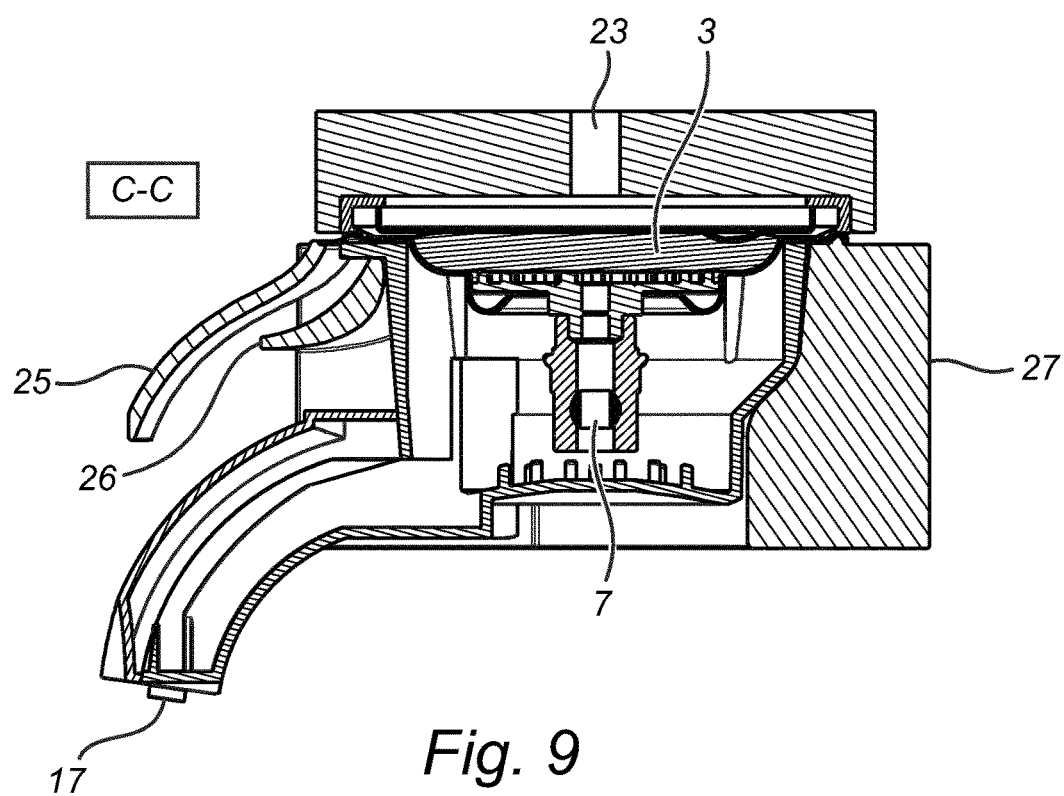
FIG. 9 shows a cross section view of the movable upper part, the removable intermediate part and the stationary part of a beverage production device wherein the ground coffee is provided in a circular pill shaped cartridge which is manufactured from heat-sealing filtering paper. The gate of the device is open. The cross section line C-C is shown in FIG. 6.

In a preferred embodiment, the beverage production device comprises a movable upper part 25, a removable intermediate part 26 and a stationary lower part 27. The removable intermediate part 26 comprises a receptacle 3 suitable to receive a pod manufactured from filter paper and comprising an extractable product. The receptacle 3 have a bowl-shaped inner space and a bottom having at least one opening 21 which is in fluid connection with a device delivery nozzle 17. The receptacle outlet comprises the channel 8 having at one end an opening 21—that communicates with the receptacle as shown in FIG. 6—and a delivery nozzle 17 (FIGS. 8 and 9). In use, pressurized fluid is fed under pressure through a tube 23 to the receptacle 3 causing the fluid to be pressed from a top side of the pod through the pod for extracting the product included in the pod. The product extract formed flows through the bottom side of the pod and the channel opening 21 (shown in FIG. 6), through the channel 8, to leave the device via the delivery nozzle 17. The device comprises a gate 7 between said receptacle 3 and said delivery nozzle 17. The gate 7 is movable between a closed position whereby the receptacle 3 and the delivery nozzle 17 are not in fluid connection with each other (shown in FIG. 8), and an open position whereby the receptacle 3 and the delivery nozzle 17 are in fluid connection with each other (shown in FIG. 9).

In a preferred embodiment, the gate 7 moves from the first position to the second position when a predetermined pressure (P) inside the receptacle 3 is reached. Said (P) is comprised between 2 and 5 bars, preferably between 2.2 and 4 bars, more preferably around 2.5 bars. The device and the method of the invention allow applying a higher brewing pressure compared to the commonly used devices. In the latter, the infusion starts flowing outside the device at a pressure around 1.2 bars. It is to be understood that the movement of the gate 7 from the first position to the second position is triggered when a predetermined (P) and/or (V) and/or (T) is reached as explained above.

Figure 7:
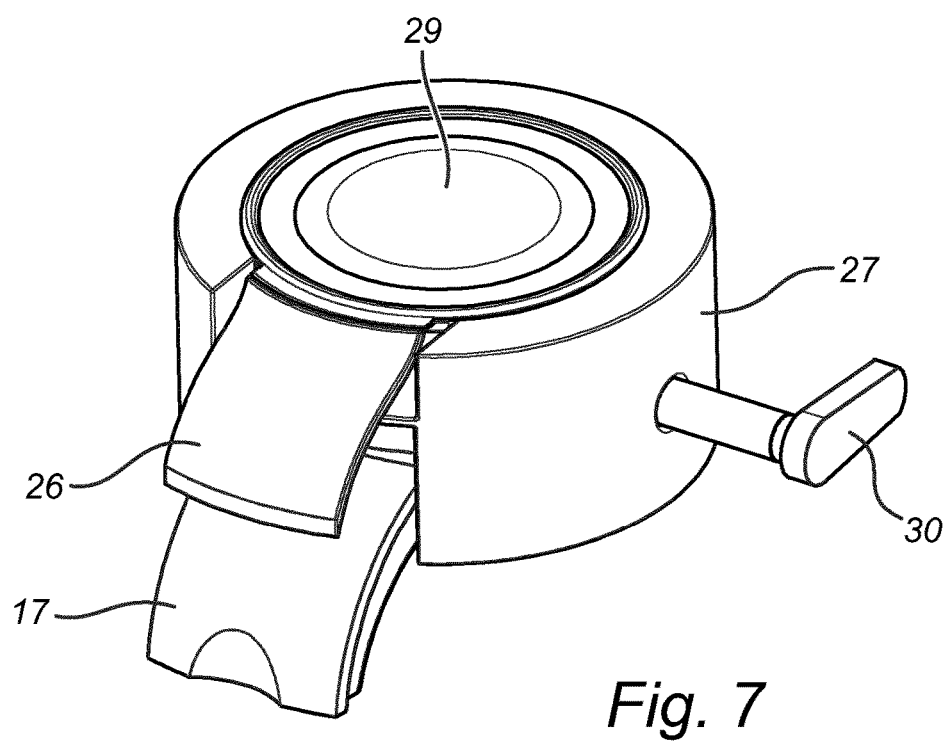
FIG. 7 shows a top view of the removable intermediate part and the stationary part of the beverage production device of FIG. 6. The removable intermediate part contains a circular pill shaped cartridge which is manufactured from heat-sealing filtering paper.

In a preferred embodiment, the receptacle 3 bottom is provided with a plurality of vertical channel-shaped protrusions 28 positioned in radial direction of the bowl-shaped inner space to the opening 21 of the channel (FIG. 6). FIG. 7 shows the stationary part 27 and the removable intermediate part 26 of the device which receptacle is housing a coffee pod 29.

In a preferred embodiment, the movement of the gate 7 is pneumatically and/or mechanically and/or electronically and/or electrically controlled.

In a preferred embodiment, the movement of the gate 7 is manually controlled. The device is provided with a gate handle for opening or closing said gate. FIG. 10 to FIG. 14 illustrate an embodiment of a device according to the present invention wherein a hard pad is used. The device is provided with a gate handle 30. It is to be understood that the gate handle can be applied to any beverage production device. It is to be understood that the gate handle can be replaced by or adapted to any pneumatic and/or mechanic and/or electronic and/or electric system for controlling the opening or the closing of the gate.

Figure 10:
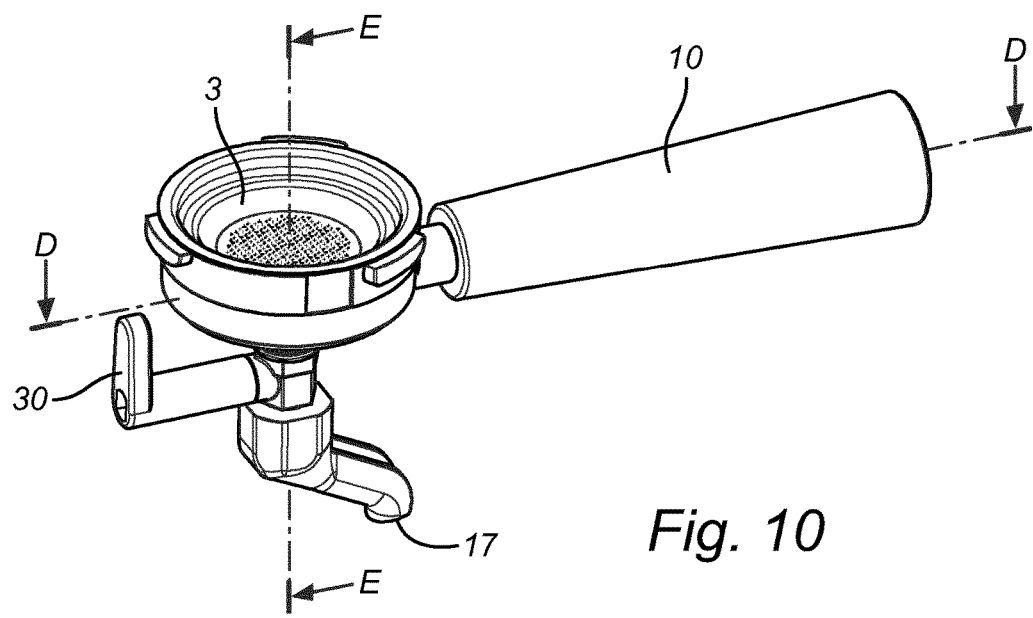
FIG. 10 shows a top view of a receptacle holder used with a manual beverage production device. The receptacle holder is suitable for containing a hard pod.
Figure 11:
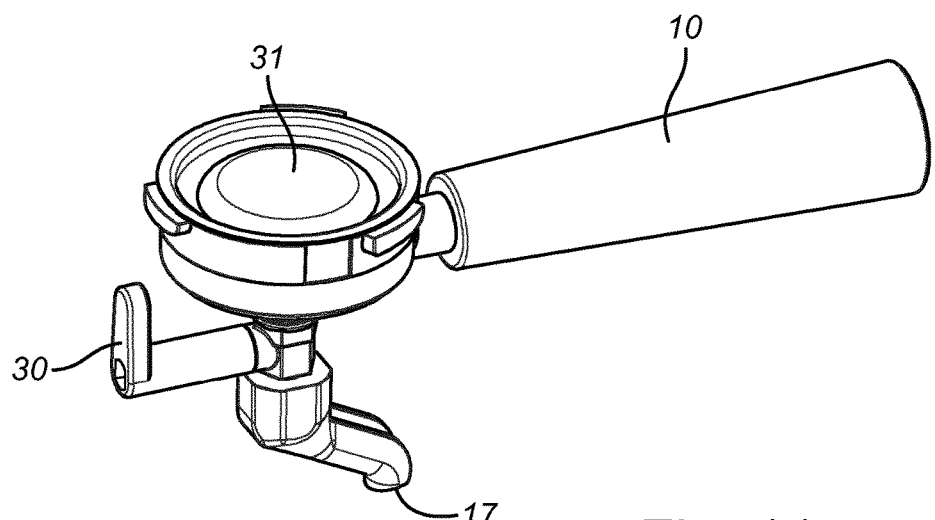
FIG. 11 shows a top view of a receptacle holder used with a manual beverage production device. The receptacle holder contains a hard pod.
Figure 14:
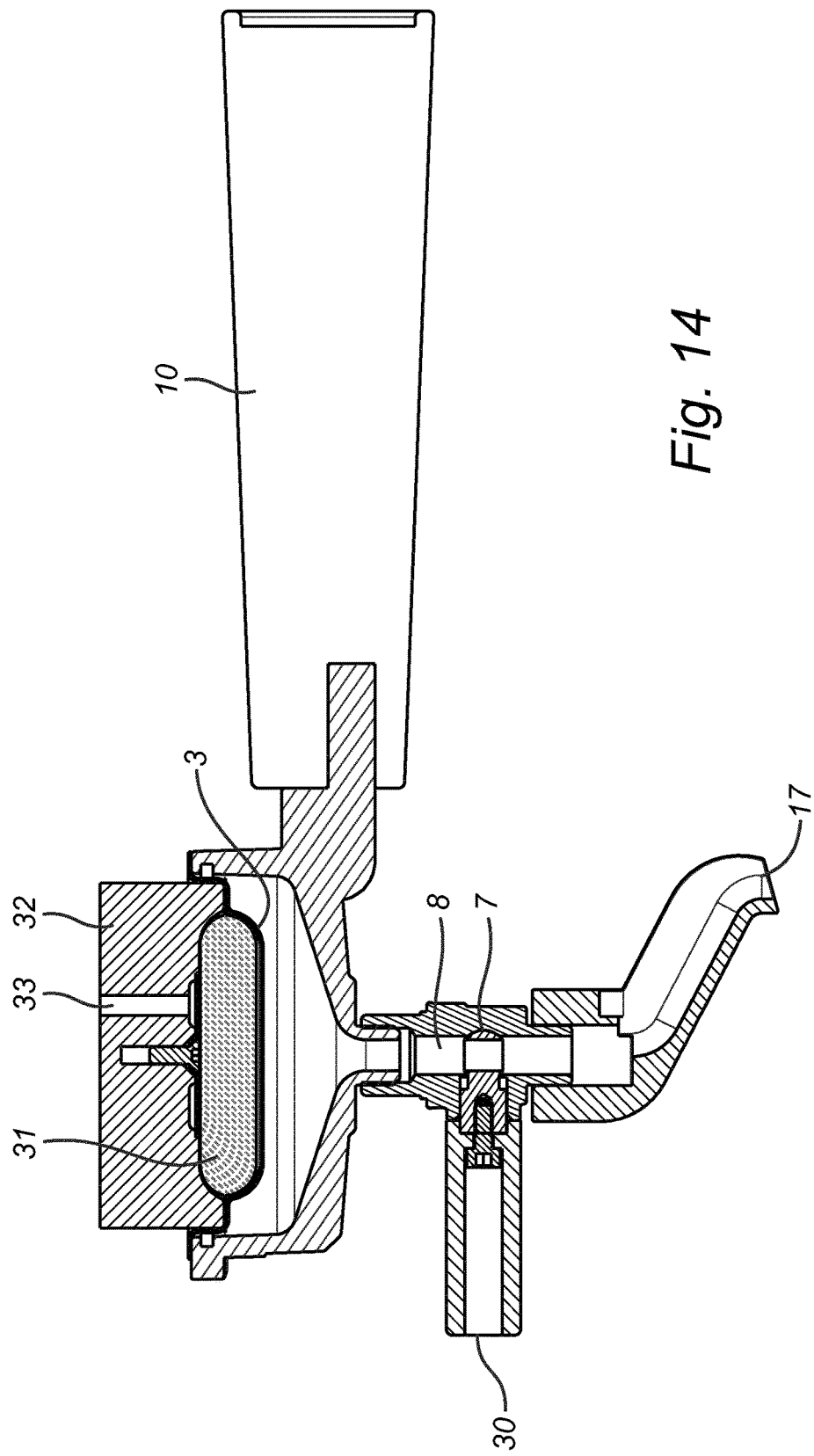
FIG. 14 shows a longitudinal cross section of the receptacle holder containing a hard pod. The section is also along line D-D of FIG. 10. The gate of the device is open.

FIG. 10 shows a top view of a receptacle holder used with a manual beverage production device. The receptacle holder is suitable for containing a hard pod. The receptacle holder comprises a receptacle 3, a handle 10, a delivery nozzle 17 and a gate handle 30. Said gate handle 30 is manually movable for opening or closing the gate inside the receptacle holder. FIG. 11 shows a top view of the same receptacle holder wherein a hard pod 31 is introduced.

FIG. 12 A and FIG. 12 B show longitudinal cross sections of the receptacle holder along different lines. The receptacle does not contain a hard pod. A channel 8 and a gate 7 are provided. In the position shown on FIG. 12 A and FIG. 12 B the gate 7 is closed.

FIG. 13 shows a longitudinal cross section of the receptacle holder containing a hard pod. The receptacle holder in connected to the brewing device 32. The gate 7 of the device is closed due to the position of the gate handle 30. Pressurized fluid is provided to the receptacle through a tube 33 in the brewing device 32. When the pressure inside the receptacle 3 reaches a predetermined value (P), the gate handle 30 is moved manually thereby placing the gate 7 in the position shown in FIG. 14. The infusion is then allowed to flow outside the receptacle holder through the delivery nozzle 17. It is to be understood that the movement of the gate 7 takes place when a predetermined (P) and/or (V) and/or (T) is reached as explained above.

In a preferred embodiment, the beverage production device receptacle 3 is provided with at least one sensor for the detection of the pressure inside the receptacle 3. The sensor is preferably a pressure sensor. When the predetermined pressure (P) is reached inside the receptacle 3, it will be detected by said sensor which activates and initiates the movement of the gate 7 from the closed to the open position.

The apparatus and the method provided by the present invention thus provide for obtaining improved coffee beverages having good quality and using ground coffee with controlled granulometry, as well as less than normal amounts of ground coffee.

The preferred embodiments of the invention described herein are not intended to limit the scope of the invention, since these embodiments are illustrations of several preferred aspects of the invention. Any equivalent embodiments are intended to be within the true spirit and scope of this invention. Indeed, various modifications of the invention in addition to those shown and described herein will become apparent to those skilled in the art from the preceding detailed description. Such modifications are also intended to fall within the scope of the appended claims.

The invention claimed is:

1. A method for preparing a beverage from an extractable product in a beverage production device, said device is provided with a receptacle having an inlet for the extractable product and an outlet for the extracted beverage, comprising the steps of:
providing said extractable product into the receptacle,
closing off completely the outlet of the receptacle thereby having said receptacle in a closed status,
providing a pressurized fluid through the inlet on and/or in the receptacle, thereby pre-extracting the extractable product in the closed receptacle,
measuring and/or detecting a pre-determined threshold, wherein said pre-determined threshold is a volume and/or a pressure and/or a time related threshold, and
rotating a two-way valve from a closed position to an open position, thereby actively opening the outlet when said pre-determined threshold is reached thereby having said receptacle in an open status,
wherein during brewing time and until the end of the brewing, the receptacle remains in the open status in which fluid can flow out of the device, wherein the opening and/or the closing of the outlet is completely and instantly performed, wherein said outlet can only be in the open status or in the closed status, and wherein the outlet remains open at the end of a brewing cycle until the next brewing cycle.

2. A method according to claim 1, wherein said pre-determined volume related threshold is a pre-determined volume of pressurized fluid provided through the inlet of the receptacle, said pre-determined volume is from 10 to 30 ml.

3. A method according to claim 1, wherein said pre-determined time related threshold is a pre-determined time during which the pressurized fluid is provided through the inlet of the receptacle, said pre-determined time is from 1 to 5 seconds.

4. A method according to claim 1, wherein said pre-determined pressure related threshold is a pre-determined pressure inside the receptacle, said pre-determined pressure is comprised between 1 and 7 bars.

5. The method according to claim 1, wherein the opening and the closing of the outlet is manually, electrically, electronically, mechanically, electromechanically or hydraulically controlled.

6. The method according to claim 1, wherein the extractable product is a pre-portioned dose of coffee provided in a pouch, capsule, pod or a pad.

7. A device for preparing a beverage from an extractable product said device is provided with a receptacle having an inlet for the extractable product and an outlet for the extracted beverage; a pump suitable for supplying a pressurized fluid through the inlet of the receptacle on and/or in the extractable product;
wherein the receptacle outlet comprises at least one channel having at one end an opening which is in fluid connection with the receptacle and, at the other end, at least one delivery nozzle; and a rotatably engaged two-way valve movable between only two positions being a closed position in which the channel is not in fluid communication with the receptacle and an open position in which the channel is in fluid communication with the receptacle, wherein said gate is controllable by a pre-determined threshold, selected from volume and/or pressure and/or time related threshold and the movement of said gate is complete and instant, and wherein the outlet is configured to remain open at the end of a brewing cycle until the next brewing cycle.

8. The device according to claim 7, wherein the height to the width ratio of the receptacle is comprised between 0.5 and 2.

9. The device according to claim 7, wherein the receptacle of the beverage production device has a shape selected from the group of: cylindrical, substantially cylindrical, frusto conical and inversed frusto conical.

10. A receptacle, suitable to be attached to a device for preparing a beverage from an extractable product, having an inlet for introducing the extractable product, an outlet for the extracted beverage; said outlet comprises at least one channel having at one end an opening which is in fluid connection with the receptacle and, at the other end, at least one delivery nozzle, and a rotatably engaged two-way valve movable between only two positions being a closed position in which the channel is not in fluid communication with the receptacle and an open position in which the channel is in fluid communication with the receptacle, wherein the movement of said gate is complete and instant, and wherein the outlet is configured to remain open at the end of a brewing cycle until the next brewing cycle.

11. A receptacle according to claim 10, wherein said receptacle is provided with at least one sensor for measuring the pressure inside the receptacle and/or the volume of fluid provided to the extractable product and/or the time during which fluid is delivered to the extractable product.

12. A system for preparing a beverage from an extractable product comprising a device as described in claim 7 and an extractable product which is a pre-portioned dose of coffee provided in a pouch, capsule or a pad, wherein said extractable product is suitable to be closely-fitted in the receptacle of the device.

13. A system according to claim 12, wherein said extractable product consists of an amount of ground coffee suitable to be provided to the receptacle, said amount of ground coffee is comprised between 4 and 6 grams, per cup of coffee.

14. The device according to claim 8, wherein the height to the width ratio of the receptacle is between 0.6 and 1.5.

15. The device according to claim 8, wherein the height to the width ratio of the receptacle is between 0.8 and 1.

* * * * *